Figure 1:
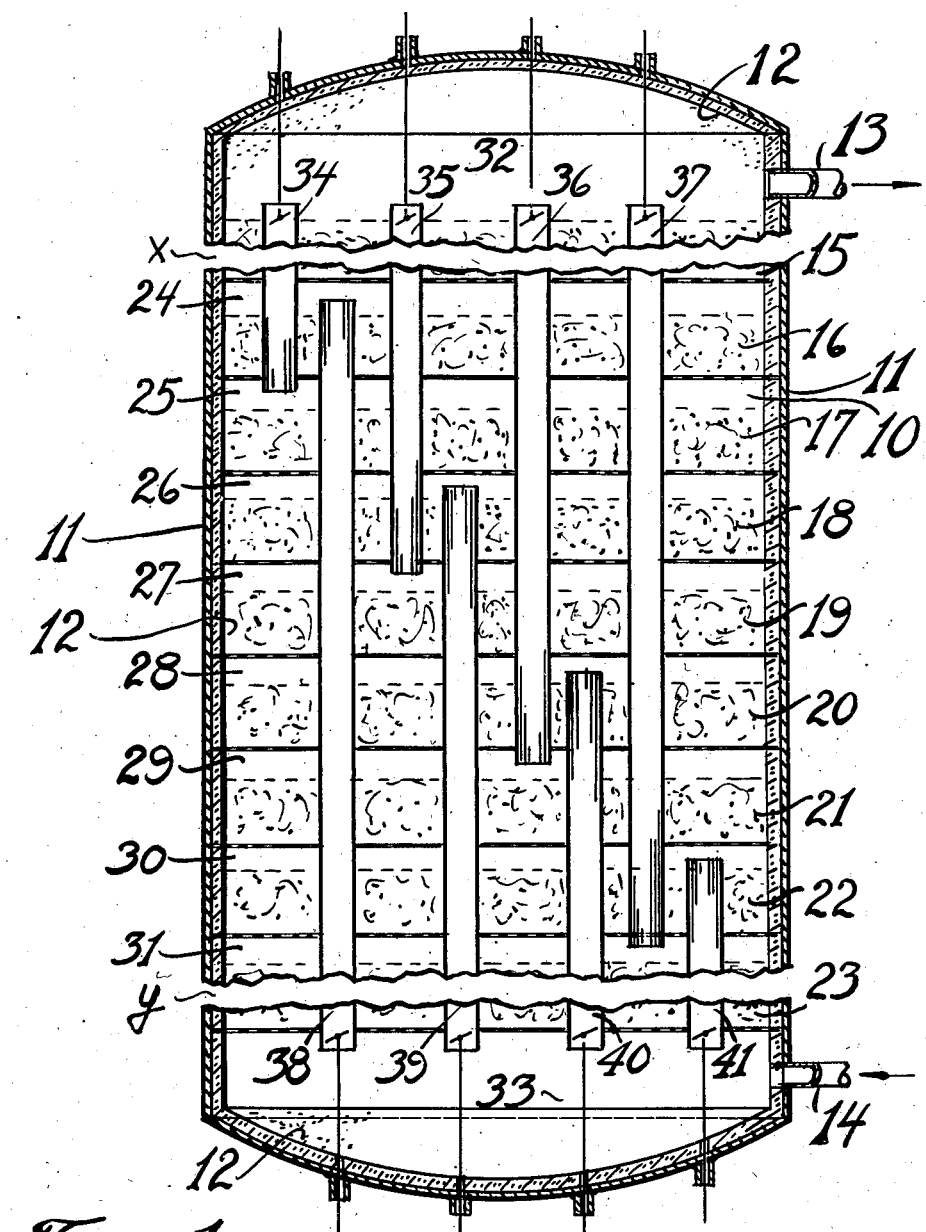

Sept. 30, 1941.   H. Z. MARTIN ET AL   2,257,178
REACTION CHAMBER
Filed Dec. 3, 1938   2 Sheets-Sheet 1

Homer Z. Martin
Donald L. Campbell  Inventors
By P. L. Young  Attorney

Sept. 30, 1941.  H. Z. MARTIN ET AL  2,257,178
REACTION CHAMBER
Filed Dec. 3, 1938  2 Sheets-Sheet 2

Homer Z. Martin
Donald L. Campbell  Inventors
By P. L. Young  Attorney

Patented Sept. 30, 1941

2,257,178

UNITED STATES PATENT OFFICE 2,257,178

REACTION CHAMBER

Homer Z. Martin and Donald L. Campbell, Elizabeth, N. J., assignors to Standard Oil Development Company, a corporation of Delaware Application December 3, 1938, Serial No. 243,732

4 Claims. (Cl. 23—288)

This invention relates to reaction chambers adapted to contain solid contact masses and pertains more particularly to a reaction chamber in which the contact mass is arranged in a plurality of separate beds supported within the chamber, and wherein it is desired during certain periods of operation to modify the flow of products through the reaction chamber.

While the invention in its broader aspects will have a more general application as will be made apparent hereinafter, it is particularly adapted for the treatment of hydrocarbon oils, such as in the cracking, purifying and refining of hydrocarbon oils, wherein the oil to be treated is passed through a reaction chamber containing a mass of contact material capable of bringing about the desired cracking, purifying or refining treatment. During such treatment, the contact mass within the reaction chamber more or less gradually becomes fouled with carbonaceous accumulations which must be periodically removed to restore the effectiveness of the contact material.

In some cases, such as, for example, in the purifying and refining of oils in which the carbonaceous accumulations may be of a tarry nature, such accumulations can be removed by passing a solvent fluid through the mass. In other cases, such as in the catalytic cracking of oils, either the accumulations are relatively solid carbonaceous deposits or the carbonaceous deposits are burned by passing oxidizing gas, such as air, or air diluted with inert gases through the material to be regenerated.

In either case, it is necessary to periodically interrupt the treating operation in order to regenerate or reactivate the contact material. In order to reduce the length of time the reaction chamber is out of operation, it is desirable to pass large volumes of regenerating fluid through the contact material in the shortest possible time. However, the resistance of the contact material to the flow of the regenerating fluid therethrough increases as the square of the velocity of the regenerating fluid. Larger volumes of regenerating fluid can be passed through the contact material per unit of time without correspondingly increasing the velocity of the regenerating fluid by subdividing the contact material within the reaction chamber into a plurality of separate units and passing the regenerating fluid through the separate units in parallel. In such case, the velocity of the fluid for passing a given volume of fluid through the contact material per unit time will be inversely proportional to the number of units into which the contact mass has been subdivided.

By providing a plurality of individual beds of contact material in the reaction chamber itself and passing the regenerating fluid through the individual beds in parallel, regeneration can be accomplished in a much shorter time without increasing the amount of back pressure necessary to force the fluid through the chamber.

During the treating cycle, however, the degree of treatment depends, among other factors, upon the length of time the oil is in contact with the material. The time of contact in turn is dependent upon the linear velocity of the oil stream and the depth of the contact mass through which it passes. If the oil vapors are passed through the individual beds of contact material in parallel to obtain the required contact time, the velocity of the gases in many cases will be so low as to produce unequal distribution of the oil throughout the contact mass. If, on the other hand, the depth of the contact mass in the individual beds are such as to produce the desired contact time at a velocity such as to avoid unequal distribution, the depth of the bed will be such as to produce an excessive resistance to the flow of fluid during the regenerating cycle. Expressed in other words, the velocity of the gases to be treated during the treating cycle may be of entirely different order than the desired velocity of the gases for effecting the regeneration.

In view of the above, it has heretofore been proposed to provide a reaction chamber wherein the regenerating fluid may be passed through the individual beds of contact material in parallel during the regeneration treatment and the products to be treated can be passed through the individual beds in series during the treating period. While this overcomes many of the objections above mentioned, it has certain other disadvantages. If the products to be treated pass through the individual beds in series, the size of the reactor is limited to one in which the desired contact time is obtained without increasing the velocity of the gases to a degree such that the resistance of the contact mass becomes excessive.

Such excessive resistance may not only increase the pumping and equipment cost to a prohibitive extent, but may seriously affect the nature and quality of product produced. In many reactions, for example, there is an optimum pressure for carrying out the reaction. If the pressure drop through the reaction chamber is excessive due to the resistance of the contact material, such pressure differential between the inlet and outlet may adversely affect the results obtained.

One of the principal objects of the present invention is to provide a reaction chamber containing a plurality of beds of contact material in which the flow of products through the reaction chamber may be through the individual beds in parallel, through the individual beds in series or in parallel through a plurality of sets of beds, the products passing through the individual beds of each set in series.

A further object of the invention is to provide a reaction chamber containing a plurality of beds of contact material constructed and arranged so as to permit series flow through the individual beds, parallel flow through the individual beds or parallel flow through given sets of individual beds, each set being made up of an equal number of beds of contact material through which the products pass in series.

A further object of the invention is to provide a reaction chamber of simple construction having a single inlet and outlet and containing a plurality of beds of solid contact material through which the products may be passed, either in series, parallel or combination of both.

A further object is to provide a reaction chamber which will permit the products passing through the reaction chamber to be distributed to pass in parallel through separate catalyst units, each unit being composed of one or more catalyst beds and wherein the resistance to the flow of products so distributed will be substantially uniform.

Other objects of the invention will be apparent from the more detailed description hereinafter, in which reference will be made to the accompanying drawings wherein Fig. I is a vertical cross sectional view of a reaction chamber containing nine separate beds of solid material constructed according to the invention and Fig. II is a diagrammatic illustration of an apparatus containing fifteen beds of contact material.

In accordance with the broad phases of the invention, the reaction chamber is provided with an odd multiple of an odd plural number of beds of contact material separated from each other by vapor spaces. The number of individual beds may be, for example, 9, 15, 21, 25, 27, 33, etc. Internal ducts are provided permitting free communication between alternate vapor spaces with one end of the reaction chamber and a second series of conduits are provided permitting free communication between the intervening vapor spaces, with the opposite end of the reaction chamber. Each of these vapor conduits are provided with valves. By closing all of the valves, products introduced at one end of the reaction chamber may be passed through all of the catalyst beds in series before being withdrawn to the opposite end. By opening the valves in the conduits, products introduced at one end of the reaction chamber may be passed in parallel through the separate beds of the contact material before being removed from the opposite end of the reaction chamber. By opening certain valves and closing others, products introduced at one end of the reaction chamber may be passed in parallel through separate sets of catalyst beds, each set being made up of an equal number of catalyst beds, through which the products pass in series before being withdrawn from the reaction chamber.

Referring to the drawings, the numeral 10 designates a reaction chamber comprising an outer metal shell 11 provided with a suitable refractory lining 12. Leading from the upper end of the reaction chamber is a conduit 13 and from the bottom of the reaction chamber is a conduit 14.

Supported within the reaction chamber in any suitable manner are a plurality of beds of contact material amounting to an odd multiple of an odd number. For illustrating purposes, there have been shown in the drawing nine beds of contact material numbered 15 to 23 inclusive reading from top to bottom, of which the top and bottom beds may be of variable thickness as later set forth, and as indicated in Fig. 1 by the broken portions $x$ and $y$ respectively. Each bed is supported on perforated trays mounted within the chamber in any suitable manner. The adjacent beds are separated from each other to form free spaces 24-31 inclusive reading from top to bottom. A free space 32 is likewise provided at the top of the reaction chamber communicating with the outlet conduit 13 and a free space 33 is provided at the bottom of the reaction chamber communicating with the conduit 14. Depending from the free space 32 at the top of the reaction chamber is a series of internal ducts 34, 35, 36 and 37. Duct 34 provides communication between the top free space 32 and the free space between the catalyst beds 16 and 17. Duct 35 provides communication between the upper free space 32 and the free space 27 between catalyst beds 18 and 19. Duct 36 provides communication between the upper free space 32 and free space 29 between beds 20 and 21, and duct 37 provides communication between the top free space 32 and the free space 31 between beds 22 and 23. Thus, it will be seen that the internal ducts 34, 35, 36 and 37 permit communication between the upper end of the reaction chamber and alternate free spaces between the adjacent catalyst beds.

Extending upwardly from the lower vapor space 33 is a second series of internal conduits 38 to 41 inclusive. Internal conduit 38 permits communication between the free space 24, between beds 15 and 16, and the bottom of the reaction chamber; conduit 39 provides communication between free space 26, between beds 17 and 18 and the bottom of the reaction chamber; conduit 40 provides communication between free space 28, between beds 19 and 20 and the bottom of the reaction chamber, and conduit 41 provides communication between free space 30, between beds 21 and 22, with the bottom of the reaction chamber.

It will be apparent from the above, that the series of conduits 34, 35, 36 and 37 provides communication between alternate free spaces and the top of the reaction chamber, whereas the second series of ducts 38, 39, 40 and 41 provide communication between the intervening free spaces and the bottom of the reaction chamber.

Each of the vapor conduits 34 to 41 inclusive are provided with a suitable valve so as to open or close the conduits. The valves are provided with suitable operating rods extending outside of the reaction chamber as shown diagrammatically in the drawing. The valves may be of any suitable construction, such as butterfly valves as shown, or they may, for example, comprise closure plates adapted to seal over the ends of the conduits.

When all of the valves are in closed position as illustrated in the drawing, products introduced into the bottom of the reactor must pass through all of the beds of contact material in series before being removed from the opposite end of the reactor. By opening all of the valves, products introduced into the reactor may be caused to pass in parallel through the individual beds of contact material. For example, products introduced into the bottom of the reactor through conduit 14 will flow as follows: a portion of the products amounting to approximately one-ninth of the total will pass upwardly through the bottom bed 23 thence through conduit 37 to the outlet 13. Another portion amounting to about two-ninths of the total will pass upwardly through conduit 41 to the free space 30 from whence one portion will pass downwardly through the bed 22 thence through duct 37 to the outlet. The remaining portion will pass upwardly through bed 21 thence through duct 36 to the outlet 13. Another fraction amounting to about two-ninths of the total will pass upwardly through duct 40 to the free space 28 from whence one-half will pass downwardly through bed 20 thence through duct 36 to the outlet 13, whereas the other half will pass upwardly through bed 19 thence through duct 35 to the outlet 13. A further fraction amounting to two-ninths of the total will pass from the bottom of the reactor through duct 39 to the free space 26 from whence one half will pass downwardly through bed 18 and thence through conduit 35 to the outlet 13, whereas the other half will pass upwardly through bed 17 thence through conduit 34 to the outlet 13. The remaining fraction introduced into the reactor, amounting to two-ninths of the total will pass upwardly through duct 38 to the free space 24 from whence one half will pass downwardly through bed 16 and thence through duct 34 to the outlet 13, whereas the remainder will pass directly through the uppermost bed 15 to the outlet 13.

By closing valves in ducts 34, 35, 37, 38, 40 and 41 and opening valves in ducts 36 and 39, the products introduced into the reactor may be caused to pass in parallel through three separate sets of catalyst beds, each set consisting of three beds as follows: a portion of the products introduced into the bottom of the reactor amounting to one-third the total will pass upwardly through the three lower beds 21, 22 and 23 and thence through conduit 36 to the outlet 13. The remaining two-thirds of the products introduced into the reactor will pass upwardly through the duct 39 to the free space 26 from whence it will divide, a half passing upwardly through the top three beds 15, 16 and 17 and the other half passing downwardly through the three intermediate beds 18, 19 and 20 and discharging through duct 36 to the outlet 13.

When employing the reaction chamber for the catalytic treatment of hydrocarbon oils, for example, it is desired to carry out the cracking cycle according to the last mentioned flow and to carry out the regenerating cycle by passing the regenerating gases through the individual beds in parallel.

In order to obtain uniform results, it is desirable that the separate streams of products passing through the separate beds in parallel or through the separate groups of beds in parallel as before described, should be subjected to substantially uniform resistance during their passage through the reaction chamber. Stated in another way, when operating in parallel for example, products passing through the lower bed 23 and thence through conduit 37 to the outlet 13 should meet substantially the same resistance to the flow, as products passing, for example, upwardly through duct 39 thence downwardly through bed 18 and outwardly through duct 35. In other words, the pressure drop between the inlet and the outlet of the reaction chamber arising by virtue of the resistance of the individual beds and the internal ducts to the flow of products should be substantially the same for all of the streams heretofore described. The pressure drop for the individual streams previously described may be equalized in various ways, such as, for example, by modifying the depth of the contact material through which the individual streams must pass, by the provision of dummy conduits within the separate beds and by modifying the size of the separate internal conduits in accordance with the volume of products passing therethrough. For example, in the drawing, when operating in parallel, the products passing through all of the intermediate beds are transferred through two internal conduits whereas products passing through the top and bottom beds pass through only one internal conduit. While the total length of internal conduit through which the various streams pass in each case is not materially different, those products passing through two separate conduits may meet substantially greater resistance than the streams passing through a single internal conduit due to the fact that the greatest resistance to the flow occurs at the inlet and outlet of the conduits. It is desirable, therefore, to make the top and bottom beds sufficiently thicker than the remaining beds to compensate for the difference in resistance due to the fact that products passing through these two beds need only be transferred through one conduit before being withdrawn from the chamber, whereas products passing through the remaining beds must pass through two conduits.

It will be evident also that distribution will be improved during combination series and parallel flow or parallel flow through separate groups of catalyst beds by making the top and bottom beds sufficiently thicker than the intermediate beds to compensate for difference in resistance arising due to the fact that products passing through either of these two beds have to pass through a single internal conduit whereas products which do not pass through these two beds have to go through two internal conduits. In the combination series and parallel flow, products passing through the top and bottom group of beds are transferred through a single internal conduit, whereas products passing through the three intermediate beds have to pass through two internal conduits.

When passing the products through the reaction chamber in the combination series and parallel flow wherein the products are caused to be passed through three separate sets of catalyst beds, each set comprising three individual beds, two-thirds of the total products as before described, must pass through conduits 36 and 39 and one-third of the total products passes through both conduits 36 and 39 before being removed from the catalyst chamber. In practical operations, therefore, it may be desirable to provide a plurality of conduits 36 and 39 connecting vapor space 29 and 26 with the top and bottom of the reaction chamber respectively. In lieu of employing a plurality of conduits 36 and 39, these conduits may be made larger than the remaining conduits. In the latter case, however, during the regenerating cycle wherein the products pass through the individual beds in parallel, the larger conduits 36 and 39 will offer less resistance to the flow of regenerating fluid therethrough and consequently unevenly distributing the regenerating medium to the various beds unless the valves in the large conduits were closed sufficiently to compensate for the difference in size of the conduits.

For illustrative purposes the ducts within the reaction chamber have been shown in the same vertical plane. It will be understood, however, that in actual construction, it is preferable to distribute the ducts uniformly over the full cross sectional area of the reaction chamber.

For convenience, the reaction chamber illustrated in Fig. 1 has been shown to contain nine separate beds of contact material. As before described, however, the invention in its broader aspects contemplates the provision of a reaction chamber containing any plurality of catalyst beds in which the total number is an odd multiple of an odd plural number. It will be apparent that such a number will always be an odd number. By providing an odd number of catalyst beds within the reactor, it is possible to introduce the products into the reactor through one inlet and withdraw them through a single outlet at the opposite end of the reactor, whereas the products flowing through the individual beds may be made to take the separate courses heretofore described. By further providing an odd multiple of an odd number of catalyst beds, the total catalyst mass may be sub-divided into a plurality of sets, each set containing the same number of individual beds, and the products may be caused to pass through the separate sets in parallel.

Figure 2:
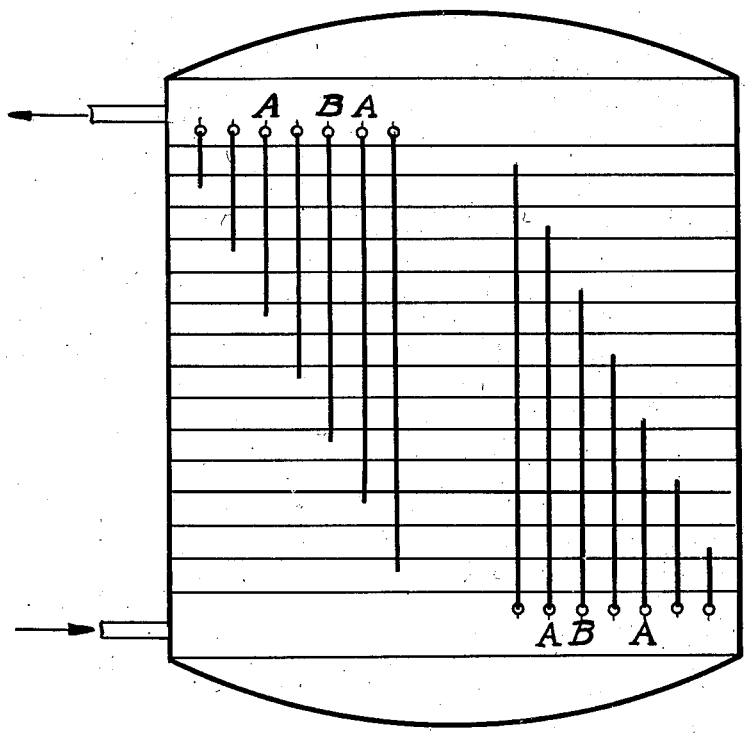

By employing a reaction chamber containing a plurality of catalyst beds wherein the odd multiple is different from the odd number, greater flexibility of operation is permissible in that the individual sets of catalyst beds contained within the reactor may either be the odd multiple or the odd number. For example, when employing a reactor containing fifteen catalyst beds such beds may be divided into five sets, each set consisting of three beds, or it may be divided into three sets, each set consisting of five beds. Furthermore, this can be accomplished by simple manipulation of valves in the internal conduits. This is more clearly illustrated in Fig. 2. Referring to Fig. 2, the reaction chamber contains fifteen separate catalyst beds. By opening the valves in conduit A and closing the valves in the remaining conduits, the products introduced into one end of the reactor will pass in parallel through five sets of catalyst beds, each set consisting of three individual beds. By closing the valves in conduit A and opening the valves in conduit B, the other valves remaining closed, the products introduced into one end of the reactor will be forced to pass through three separate sets of catalyst beds in parallel, each set comprising five individual beds.

While it was heretofore mentioned that the invention has particular application to the treatment of hydrocarbon oils, it will be understood that it will also have other applications wherein it is desired to vary the flow of products through the reaction chamber from series to parallel or from series to combined series and parallel or from combined series and parallel to parallel.

The invention, therefore, makes possible the provision of a reaction chamber of simple construction having a single inlet and outlet through which the products may be selectively passed in any of the various ways heretofore described.

Having described the preferred embodiment, it is understood that the invention embraces such other variations and modifications as come within the spirit and scope thereof. It will be also understood that it is not the intention to unnecessarily limit the invention or to dedicate any novel features thereof.

We claim:

1. An apparatus comprising a closed reaction vessel, an odd plural number of beds of contact material supported laterally in said vessel in vertically spaced relation to each other and to the vessel ends, providing a free space above and below each bed and at each end of the vessel, a series of conduits of varying lengths extending longitudinally of said vessel connecting the free space at one end thereof with alternate free spaces between the beds, one conduit of said series terminating in each alternate space, a second series of conduits of varying lengths connecting the free space at the opposite end of said vessel with free spaces intermediate the aforementioned alternate free spaces, one conduit of said second series terminating in each intermediate free space, and means for introducing a fluid material at one end of said vessel, and for removing fluid material from the other end.

2. An apparatus comprising a closed reaction vessel, an odd plural number of beds of contact material supported laterally in said vessel in vertical spaced relation to each other and to the vessel ends, providing a free space above and below each bed and at each end of the vessel, a series of conduits of varying lengths extending longitudinally of said vessel connecting the free space at one end thereof with alternate free spaces between the beds, one conduit of said series terminating in each alternate space, a second series of conduits of varying lengths connecting the free space at the other end of said vessel with free spaces intermediate the aforementioned alternate free spaces, one conduit of said second series terminating in each intermediate space, means for introducing a fluid material at one end of said vessel and for removing fluid material from the other end, and means for controlling the flow of material through the respective conduits of each series.

3. An apparatus according to claim 2 in which the means for controlling flow through said conduits are valve means in each conduit, and valve operating means connected thereto, and operable from without the reaction vessel.

4. An apparatus comprising a closed reaction vessel, a bed of solid contact material supported laterally of the vessel at each end in vertically spaced relation thereto, providing a free space at each end of the vessel, an odd number of intermediate beds of solid contact material supported laterally of the vessel between the end beds, in vertically spaced relation thereto, and to each other, providing a free space above and below each intermediate bed, means for introducing a fluid material into the free space at one end of said vessel, and for removing fluid material from the free space at the opposite end thereof, a series of conduit elements of varying lengths extending longitudinally of said vessel connecting the free space at one end thereof with alternate free spaces between the beds, one conduit of said series terminating in each alternate space, a second series of conduit elements of varying lengths connecting the free space at the other end of said vessel with free spaces intermediate the aforementioned alternate free spaces, one element of said second series terminating in each intermediate space, means for introducing a fluid material at one end of said vessel, and for removing fluid material from the opposite end, and valve means in said conduit elements for selective variation of flow through said conduit elements to provide for series flow through said beds from end to end of the vessel, parallel flow through individual beds, or parallel flow through individual equal groups of beds.

HOMER Z. MARTIN.
DONALD L. CAMPBELL.